United States Patent
Takahashi

(10) Patent No.: US 11,318,741 B2
(45) Date of Patent: May 3, 2022

(54) LIQUID DISCHARGE APPARATUS, LIQUID DISCHARGE METHOD, AND STORAGE MEDIUM

(71) Applicant: Hiroki Takahashi, Kanagawa (JP)

(72) Inventor: Hiroki Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/073,668

(22) Filed: Oct. 19, 2020

(65) Prior Publication Data

US 2021/0122155 A1    Apr. 29, 2021

(30) Foreign Application Priority Data

Oct. 23, 2019   (JP) .............................. JP2019-192678

(51) Int. Cl.
*B41J 29/393*   (2006.01)
*B41J 2/045*   (2006.01)

(52) U.S. Cl.
CPC ....... *B41J 2/04588* (2013.01); *B41J 2/04581* (2013.01)

(58) Field of Classification Search
CPC ... B41J 2/04505; B41J 2/04581; B41J 2/2132
See application file for complete search history.

(56) References Cited

U.S. PATENT DOCUMENTS

| 2003/0179256 A1* | 9/2003 | Endo ................... B41J 2/04505 347/19 |
| 2014/0043391 A1 | 2/2014 | Satoh et al. |
| 2016/0236466 A1 | 8/2016 | Takahashi et al. |
| 2019/0283410 A1 | 9/2019 | Takahashi |

FOREIGN PATENT DOCUMENTS

| JP | 2006-167956 | 6/2006 |
| JP | 2014-034144 | 2/2014 |

* cited by examiner

*Primary Examiner* — Lam S Nguyen
(74) *Attorney, Agent, or Firm* — Ipusa, PLLC

(57) ABSTRACT

A liquid discharge apparatus includes a head, a sensor, a motor, and control circuitry. The head is configured to discharge liquid in a plurality of times of scanning. The sensor is configured to measure a density of a region formed with the liquid discharged in first scanning among the plurality of times of scanning. The motor is configured to move a measurement position at which the sensor performs measurement. The control circuitry is configured to control discharge of the head in second scanning performed after the first scanning among the plurality of times of scanning, based on the measurement position and the density measured at the measurement position.

8 Claims, 20 Drawing Sheets

LIQUID DISCHARGE APPARATUS, LIQUID DISCHARGE METHOD, AND STORAGE MEDIUM

CROSS-REFERENCE TO RELATED APPLICATION

This patent application is based on and claims priority pursuant to 35 U.S.C. § 119(a) to Japanese Patent Application No. 2019-192678, filed on Oct. 23, 2019, in the Japan Patent Office, the entire disclosure of which is hereby incorporated by reference herein.

BACKGROUND

Technical Field

Embodiments of the present disclosure relate to a liquid discharge apparatus, a liquid discharge method, and a storage medium storing program code.

Related Art

There is known a so-called inkjet method of discharging liquid from nozzles of a head unit to form, e.g., an image. For example, in a head unit of an image forming apparatus, first, a plurality of nozzles are sectioned into blocks. The image forming apparatus measures the density of the image formed on a recording medium for each block. Next, the image forming apparatus generates print data to be used by one head unit so as to complement a dot missing portion generated according to the correction amount for another head unit. A method of correcting density unevenness in such a manner is known.

SUMMARY

In an aspect of the present disclosure, there is provided a liquid discharge apparatus that includes a head, a sensor, a motor, and control circuitry. The head is configured to discharge liquid in a plurality of times of scanning. The sensor is configured to measure a density of a region formed with the liquid discharged in first scanning among the plurality of times of scanning. The motor is configured to move a measurement position at which the sensor performs measurement. The control circuitry is configured to control discharge of the head in second scanning performed after the first scanning among the plurality of times of scanning, based on the measurement position and the density measured at the measurement position.

In another aspect of the present disclosure, there is provided a liquid discharge method for a liquid discharge apparatus including a head configured to discharge liquid in a plurality of times of scanning. The method includes: measuring, with the liquid discharge apparatus, a density of a region formed with the liquid discharged in first scanning among the plurality of times of scanning; moving, with the liquid discharge apparatus, a measurement position at which the liquid discharge apparatus performs the measuring of the density; and controlling, with the liquid discharge apparatus, discharge of the head in second scanning performed after the first scanning among the plurality of times of scanning, based on the measurement position and the density measured at the measurement position.

In still another aspect of the present disclosure, there is provided a non-transitory storage medium storing program code for causing a computer to execute a liquid discharge process for a liquid discharge apparatus including a head configured to discharge liquid in a plurality of times of scanning. The process includes: measuring, with the liquid discharge apparatus, a density of a region formed with the liquid discharged in first scanning among the plurality of times of scanning; moving, with the liquid discharge apparatus, a measurement position at which the liquid discharge apparatus performs the measuring of the density; and controlling, with the liquid discharge apparatus, discharge of the head in second scanning performed after the first scanning among the plurality of times of scanning, based on the measurement position and the density measured at the measurement position.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
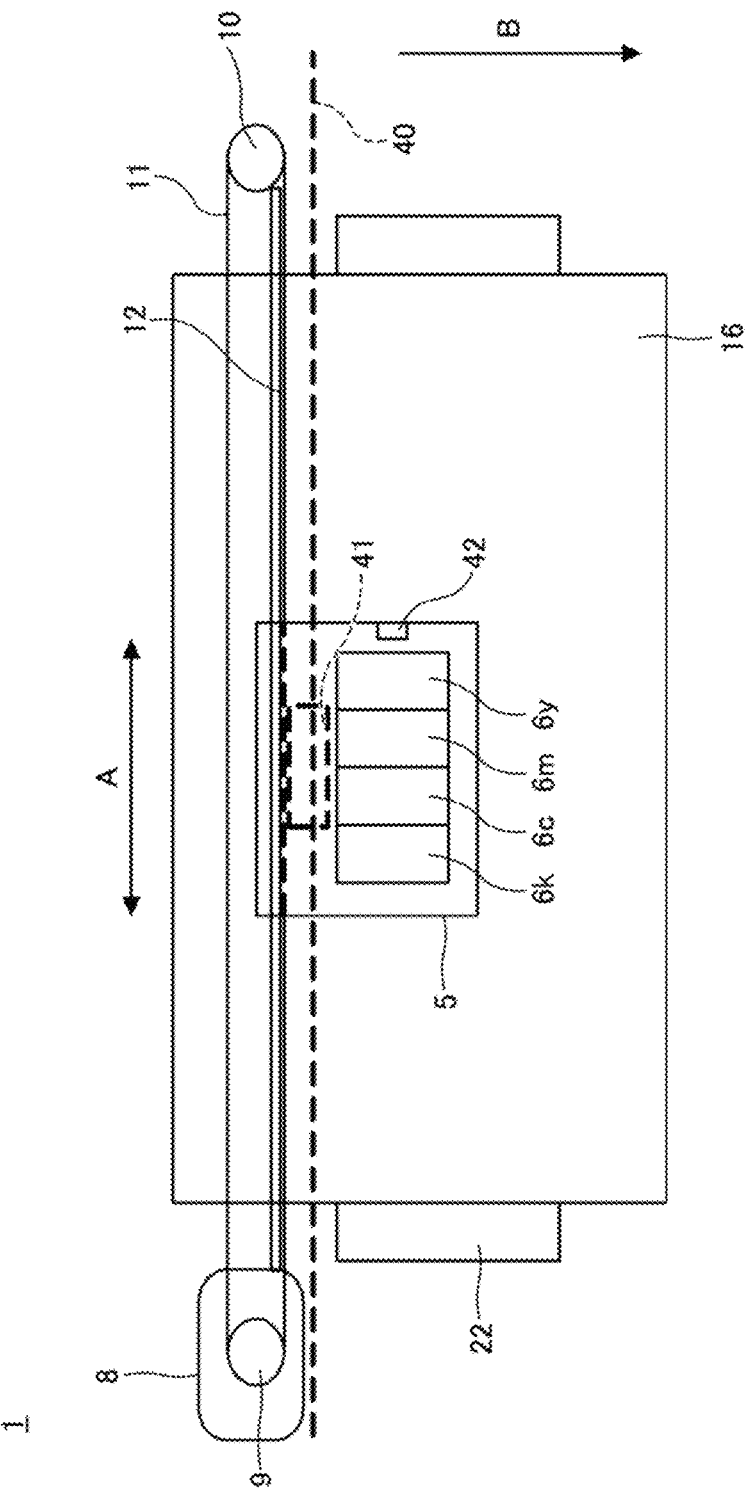
FIG. 1 is a top view of a liquid discharge apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Below, embodiments of the present disclosure are described with reference to accompanying drawings. In the following description, the same components are denoted by the same reference numerals, and redundant description may be omitted.

Overall Structure

FIG. 1 is a top view of a liquid discharge apparatus according to an embodiment of the present disclosure. Hereinafter, a description is given of an example in which the liquid discharge apparatus is a serial type inkjet apparatus (hereinafter, simply referred to as an "inkjet apparatus 1"). That is, the inkjet apparatus 1 forms an image on a recording medium, e.g., a sheet 16, with liquid, e.g., ink.

The inkjet apparatus 1 includes mechanical components such as a main scanning motor 8, a gear 9, a pressure roller 10, a timing belt 11, and a guide rod 12. The inkjet apparatus 1 reciprocates an ink carriage 5 in a main scanning direction A with such mechanical components. That is, the inkjet apparatus 1 causes the ink carriage 5 to pass in the main scanning direction A, which may be referred to as scanning or scanning operation.

The ink carriage 5 includes, for example, a yellow head 6y, a magenta head 6m, a cyan head 6c, and a black head 6k. Such heads are examples of a head unit. Accordingly, the inkjet apparatus 1 causes the ink carriage 5 to pass a plurality of times to form an image on the sheet 16.

The term "pass" refers to a reciprocating motion in the main scanning direction A to form an image or the like. Hereinafter, a case in which a plurality of passes are performed to form one image or one line is described as an example.

The position of the ink carriage 5 in the main scanning direction A is measured by, for example, an encoder sensor 41 and an encoder sheet 40.

The inkjet apparatus 1 further includes, for example, a mechanical component such as a motor that conveys the sheet 16 in a conveyance direction B. Accordingly, the sheet 16 is conveyed in the conveying direction B with respect to a platen 22 by the motor or the like.

In this manner, the inkjet apparatus 1 causes the ink carriage 5 to pass in the main scanning direction A and conveys the sheet 16 to form an image on the sheet 16.

The inkjet apparatus 1 includes, for example, a colorimetric sensor 42. The colorimetric sensor 42 is an example of a sensor that measures color density and the like. In this example, the colorimetric sensor 42 is included in the ink carriage 5. Accordingly, the measurement position of the calorimetric sensor 42 moves according to the pass of the ink carriage 5. The measurement position measured by the colorimetric sensor 42 is measured by the encoder sensor 41, the encoder sheet 40, and the like. For example, the inkjet apparatus 1 measures the density with the sensor in the pass of the ink carriage 5 to detect, e.g., the distribution of density in the main scanning direction A.

In such a manner, the inkjet apparatus 1 forms an image by, for example, a so-called multi-pass method.

Figure 2:
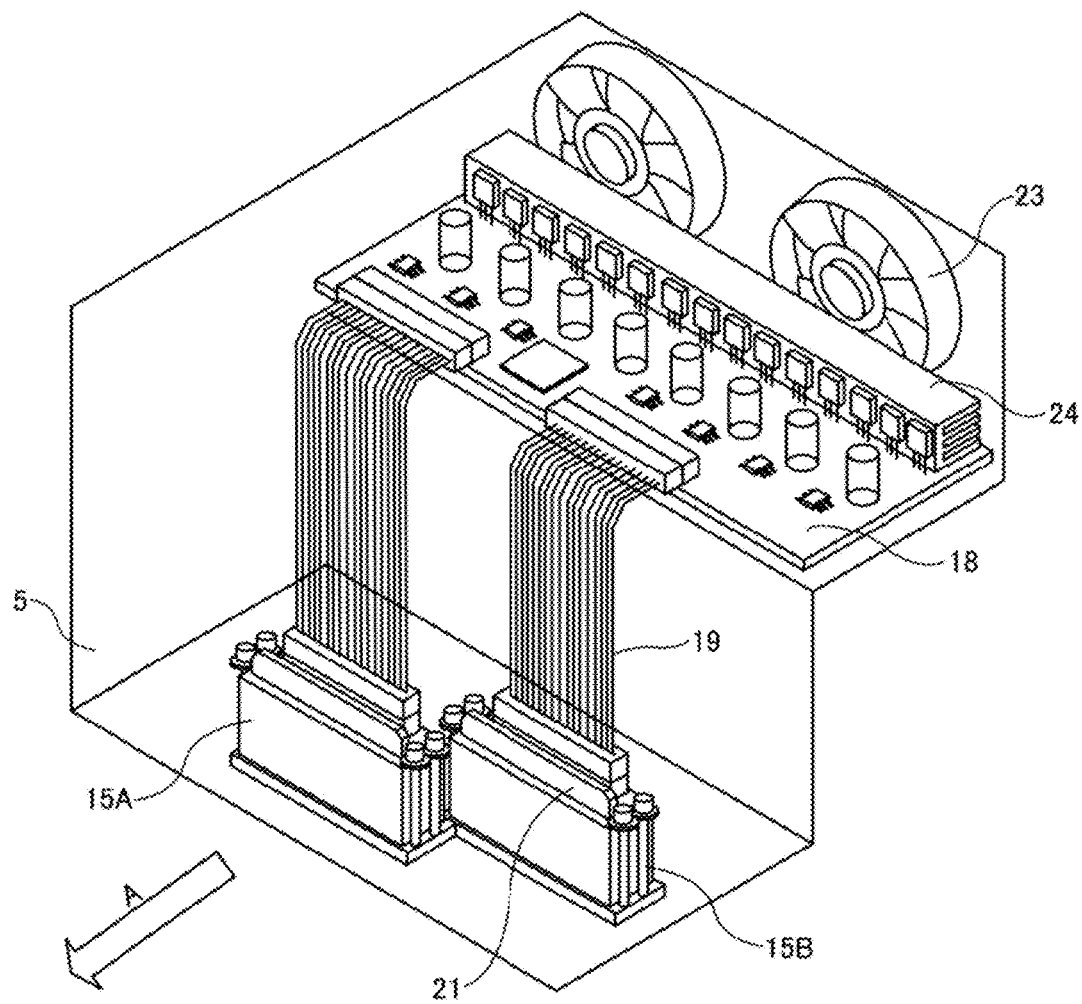
FIG. 2 is a perspective view of an example of an ink carriage.

FIG. 2 is a perspective view of an ink carriage according to an embodiment of the present disclosure. For example, the ink carriage 5 has a hardware configuration including, e.g., head modules 15A and 15B, a drive control board 18, and a cable 19. The head modules 15A and 15B are examples of heads for two colors. Hereinafter, any one of the head modules 15A and 15B may be referred to as "head module 15".

The ink carriage 5 may include cooling devices such as a cooling fin 24 and fans 23.

The drive control board 18 performs control such as inputting a drive waveform to the head module 15 through, e.g., the cable 19. The head module 15 discharges liquid according to the drive waveform.

Accordingly, the drive control board 18 includes a digital/analog (D/A) converter, an operational amplifier, an electrolytic capacitor, an electronic circuit such as a field-programmable gate array (FPGA), and a current amplification device in order to generate a drive waveform corresponding to the characteristics of each head module 15.

Thus, the drive control board 18 controls, e.g., piezoelectric elements of the head modules 15.

Figure 3:
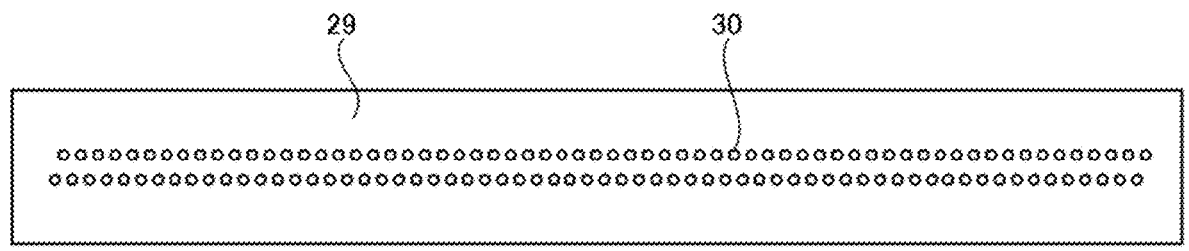
FIG. 3 is an illustration of an example of a head.

FIG. 3 is an illustration of an example of a head. FIG. 3 is an enlarged view of a surface of the head module 15 with respect to a recording medium.

A plurality of printing nozzles 30 are arranged in a staggered manner on a nozzle surface 29 that is a bottom surface of the head module 15. In this way, the printing nozzles 30 are arranged in a staggered manner to achieve high-resolution image formation.

Figure 4:
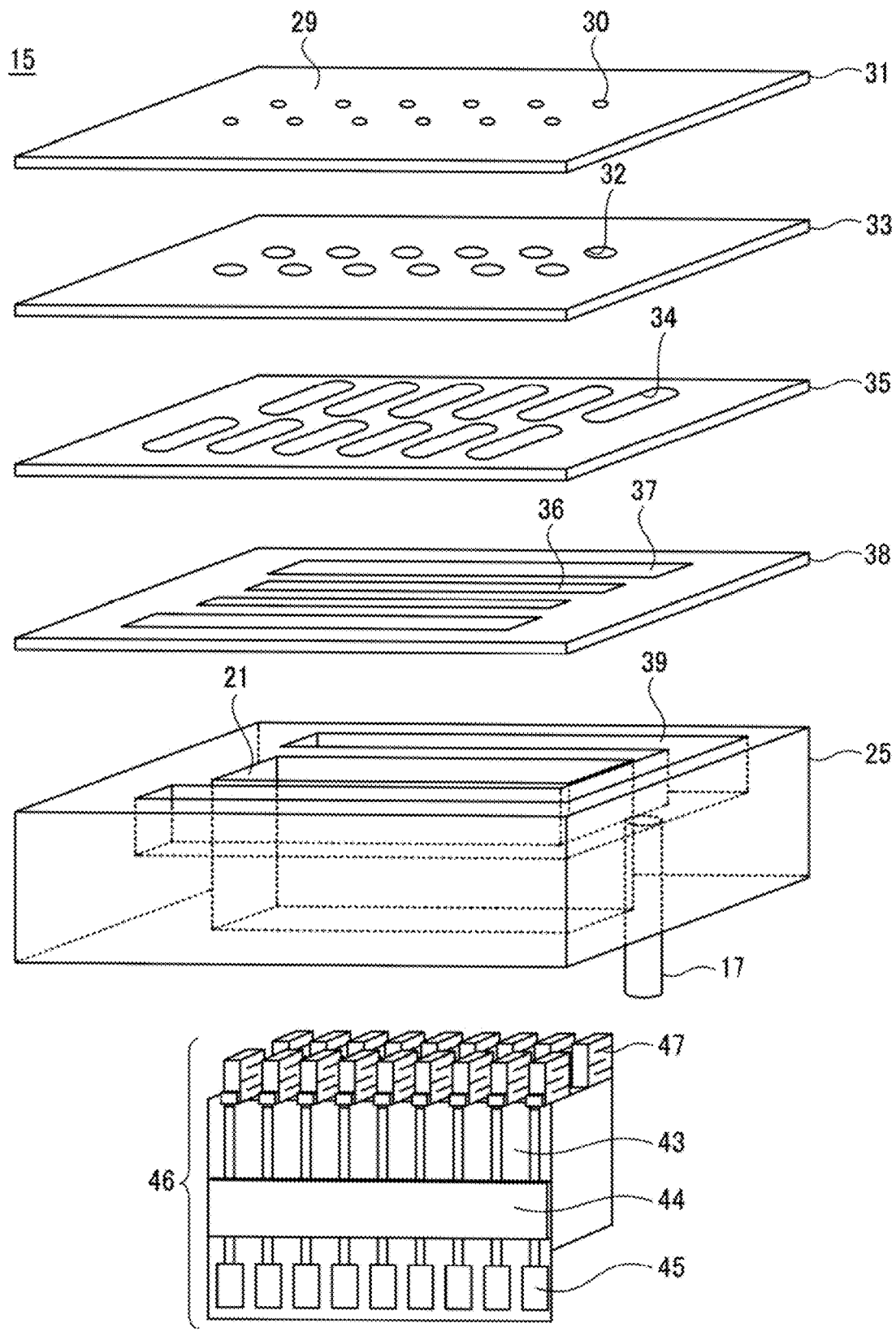
FIG. 4 is an illustration of an example of a head configuration.

FIG. 4 is an illustration of an example of the configuration of the recording head.

The head module 15 includes a nozzle plate 31, a pressure chamber plate 33, a restrictor plate 35, a diaphragm plate 38, a rigid plate 25, and a piezoelectric element group 46.

The printing nozzles 30 are arranged in a staggered manner on the nozzle plate 31.

Individual pressure chambers 32 corresponding to the printing nozzles 30 are formed in the pressure chamber plate 33.

In the restrictor plate 35, restrictors 34 and the like are formed to communicate a common ink channel 39 with the individual pressure chambers 32 to control the ink flow rate to the individual pressure chambers 32.

The diaphragm plate 38 includes diaphragms 36, filters 37, and the like.

When the nozzle plate 31, the pressure chamber plate 33, the restrictor plate 35, and the diaphragm plate 38 are sequentially stacked, positioned, and joined, a channel plate is formed.

The channel plate is joined to the rigid plate 25, and the filters 37 are opposed to openings of the common ink channel 39.

An upper opening end of an ink introduction pipe 17 is connected to the common ink channel 39 of the rigid plate 25.

A lower opening end of the ink introduction pipe 17 is connected to an ink tank filled with ink.

A piezoelectric element drive circuit 44 is mounted on a piezoelectric element support base 43.

The piezoelectric element group 46 has a configuration in which a plurality of piezoelectric elements 47 are arranged.

The piezoelectric element group 46 is inserted into the opening 21 of the rigid plate 25.

Free ends of the piezoelectric elements 47 are bonded and fixed to the diaphragms 36 to form the head module 15.

In the example illustrated in FIG. 4, factors such as the nozzles, the pressure chambers, and the restrictors are reduced for simplification. Therefore, the nozzles, the pressure chambers, the restrictors, and the like may be configured to be larger in number.

System Configuration

Figure 5:
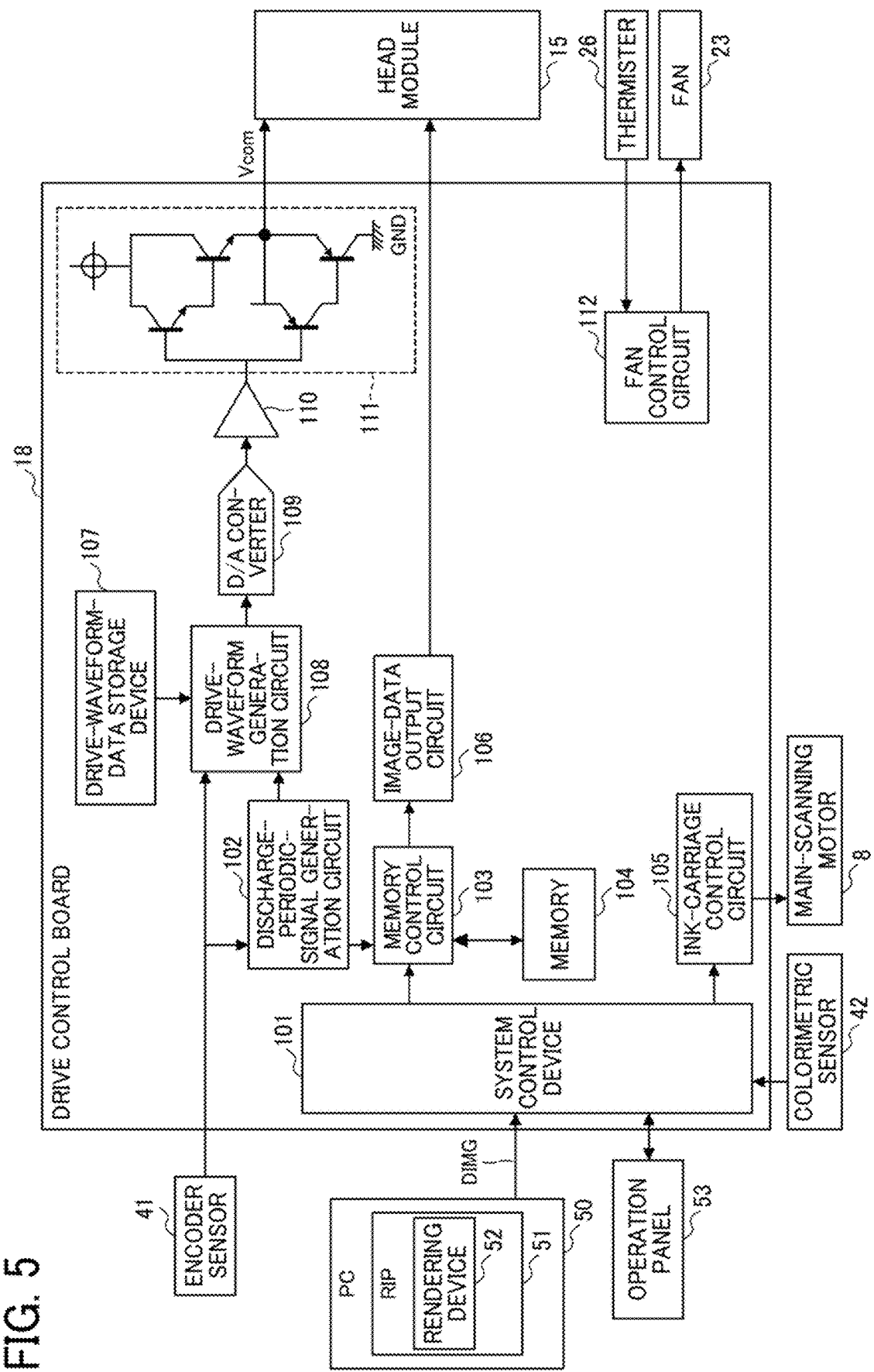
FIG. 5 is a diagram of an example of a system configuration.

FIG. 5 is a diagram of an example of a system configuration. Hereinafter, a case in which a system as illustrated in FIG. 5 is constructed with the inkjet apparatus 1 is described as an example.

A personal computer (PC) (hereinafter referred to as "PC 50") is an example of an information processing apparatus. The PC 50 includes, for example, a raster image processor (RIP) (hereinafter, referred to as "RIP 51"). The RIP 51 includes, e.g., a rendering device 52.

For example, input data representing an image as an object to be printed or a setting such as a print mode is input to the PC 50 by a user operation.

The RIP 51 performs image processing based on settings, a color profile, and the like.

The rendering device 52 performs a process of decomposing the input data and generating data representing an object to be formed in each pass. Hereinafter, the object is referred to as an image, and data representing an image to be formed in each pass is simply referred to as "image data DIMG").

For example, the drive control board 18 includes, e.g., a system control device 101, a discharge-periodic-signal generation circuit 102, a memory control circuit 103, a memory 104, an ink-carriage control circuit 105, and an image-data output circuit 106 as control circuitry.

The system control device 101 receives instructions and data such as image data DIMG from an apparatus such as the PC 50 and controls the entire system.

The discharge-periodic-signal generation circuit 102 generates, e.g., a discharge periodic signal based on, e.g., a signal output by the encoder sensor 41 and the setting of resolution set by a user's operation.

The memory control circuit 103 controls, e.g., input and output of data from and to the memory 104. For example, the memory control circuit 103 temporarily stores the image data DIMG input to the system control device 101 in the memory 104. The image data output circuit 106 outputs the image data DIMG extracted from the memory 104 by the memory control circuit 103 to, e.g., the head module 15.

The ink-carriage control circuit 105 controls the main scanning motor 8 to move the position of the ink carriage 5.

The drive-waveform-data storage device 107 stores data indicating a drive waveform for driving the head module 15 to cause the head unit to discharge liquid.

The drive-waveform generation circuit 108 uses the discharge periodic signal as a trigger to output the drive waveform extracted from the drive-waveform-data storage device 107 to the D/A converter 109.

The D/A converter 109 converts the drive waveform into an analog signal.

A voltage amplifier 110 amplifies the voltage of the analog signal.

A current amplifier 111 amplifies the current of the signal output by the voltage amplifier 110.

The head module 15 discharges liquid according to the signal based on the drive waveform processed by the D/A converter 109, the voltage amplifier 110, the current amplifier 111, and the like.

The drive control board 18 may further include a control circuit to operate an external device. For example, the drive control board 18 may include a fan control circuit 112 or the like. First, a thermistor 26 measures the temperature. The fan control circuit 112 controls the fan 23 based on the measurement result of the thermistor 26. As described above, the system may include an additional sensor, control circuitry, and a device to be controlled.

Note that the system configuration is not limited to the arrangement of the circuits and the like illustrated in FIG. 5. For example, devices included in, e.g., the PC 50 may be included in the configuration of the inkjet apparatus 1.

For example, an input-and-output device such as an operation panel 53 may be connected to the drive control board 18.

Example of Density Measurement, Movement, Calculation, and Control

Figure 6:
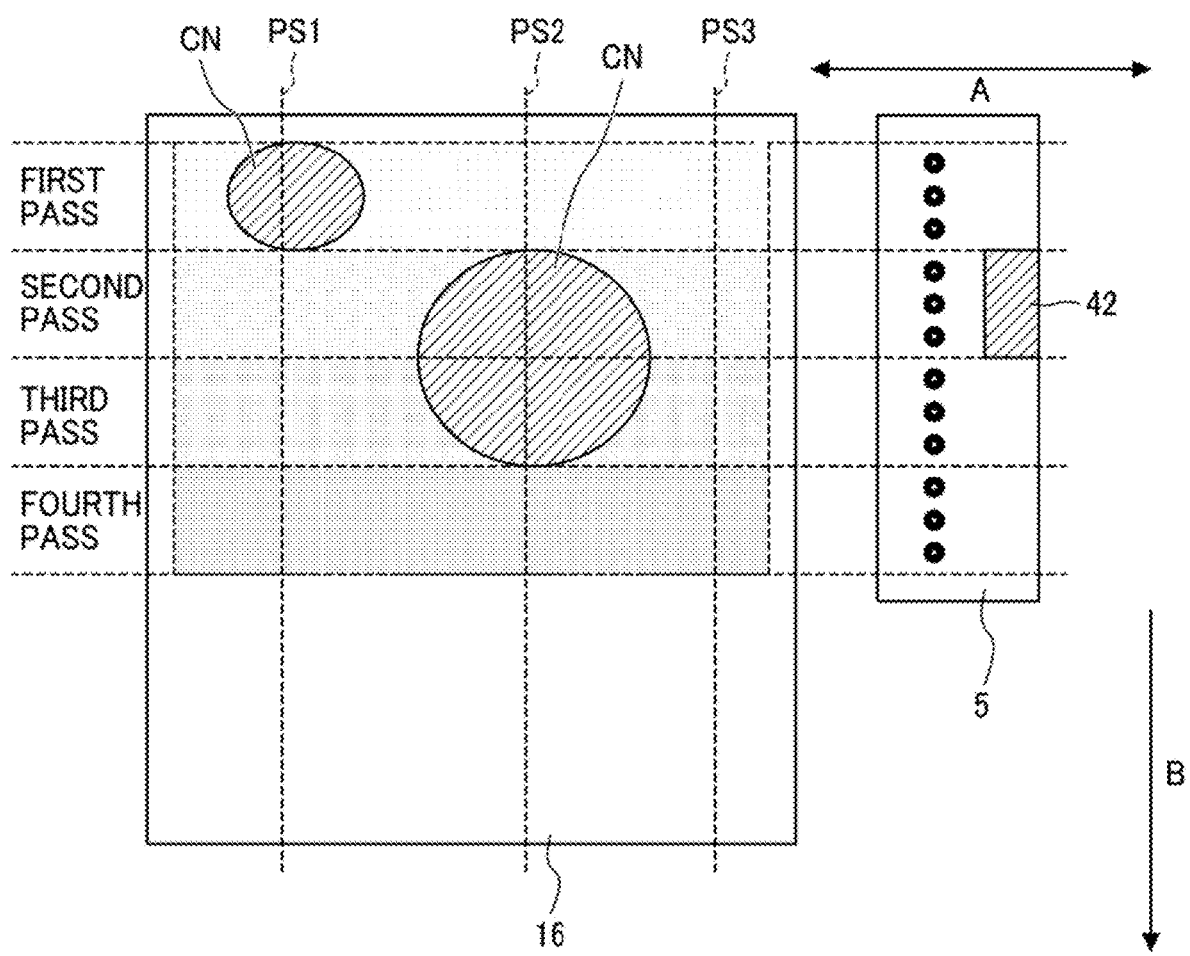
FIG. 6 is a diagram of an example of processing.

FIG. 6 is a diagram of an example of processing. Below, a case in which an image is formed by the first to fourth passes, that is, four passes is described as an example. In the following example, density measurement is performed on an object formed by the second pass. The second pass is an example of first scanning and the object is an example of a region.

The density measurement may be performed not in one pass but in a plurality of passes. For example, statistical processing may be performed in which density measurement is performed a plurality of times and, e.g., an average value of the plurality of times of measurements is calculated. When such statistical processing is performed, the density can be accurately measured.

As described above, the region is a measurement target in a stage in which all passes are not performed, and is in a state in which image formation or the like is being performed. On the other hand, in this example, when four passes are performed, image formation is completed.

Below, in this example, an example in which there is color unevenness CN, which is an example of unevenness, is described. Specifically, the example is assumed in which, in input data or the like, the density of an image to be formed is constant in the main scanning direction A but the position of the color unevenness CN is lighter than other positions for some reason. That is, in the following description, a case in which the density at the position of the color unevenness CN is lower than that at other positions is taken as an example.

In this example, the colorimetric sensor 42 measures a color measurement value as an example of density. The ink carriage 5 having the colorimetric sensor 42 moves in the main scanning direction A, and the colorimetric sensor 42 measures the density at a plurality of measurement positions in the main scanning direction A, for example, a first measurement position PS1, a second measurement position PS2, and a third measurement position PS3. In such a case, the result of density measurement is, for example, as follows.

Figure 7:
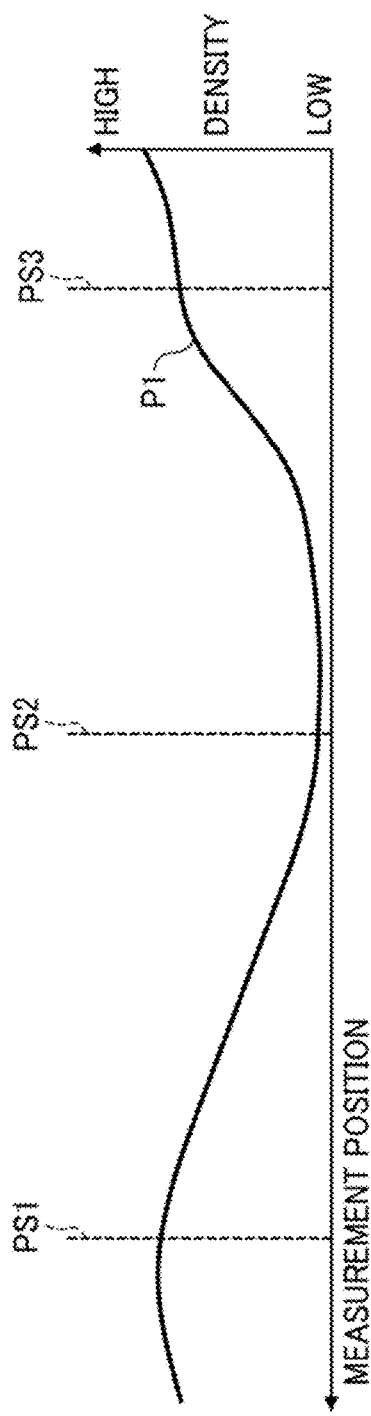
FIG. 7 is a graph of an example of density measurement.

FIG. 7 is a graph of an example of density measurement. In FIG. 7, the vertical axis represents the density and the horizontal axis represents the measurement position. In the example of the measurement result, a position having color unevenness, that is, the second measurement position PS2 has a lower density than the first measurement position PS1, the third measurement position PS3, and the like at the time point when a first-round pass has been performed, that is, at a time point of an uncompleted state when two passes, which is part of the total of four passes, have been performed. Hereinafter, the measurement result of the region formed by the first-round pass is referred to as a measurement result R1. The measurement result R1 is a so-called density profile.

The measurement position is a position at which the colorimetric sensor 42 measures the density, and is specified by, e.g., a value indicated by the encoder sensor 41. The measurement position is associated with the value of density to generate data such as a so-called color profile. When there are a plurality of colors, such data may be generated for each color.

Therefore, from the measurement result R1, a relationship in which the density is lower at the second measurement position PS2 or the like than at other positions is calculated. For example, the relationship between the measurement position and the density is calculated such that the density of the second measurement position PS2 is lower than the density of the first measurement position PS1 having the highest density by several percent. The relationship is not limited to the result of calculation of a relative value with respect to a specific position. For example, the relationship may be, e.g., a mathematical expression calculated by tabulating, functionalizing, or approximating the measurement result R1. The relationship may also be a result of calculating an average value of the density for one pass and specifying a position at which the density becomes higher or a position at which the density becomes lower than the average value by a predetermined value or more.

When the relationship between the density and the measurement position is calculated, for example, the density of the image can be estimated as follows.

Figure 8:
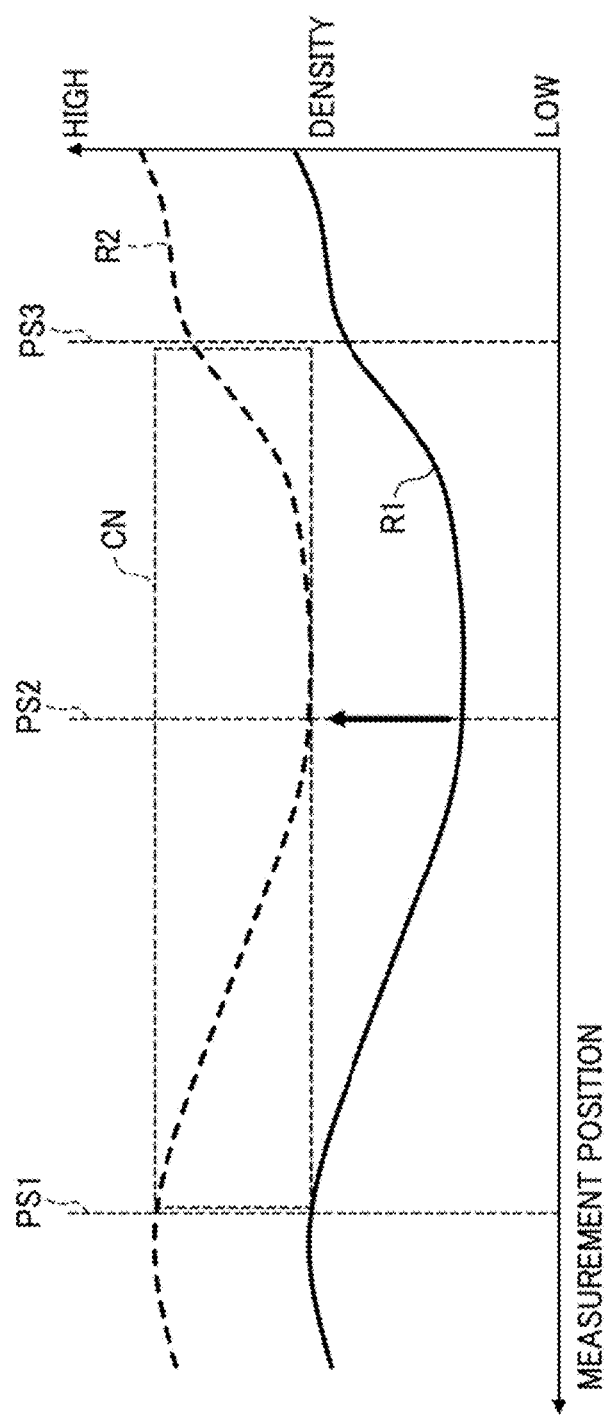
FIG. 8 is a graph of an example of estimation.

FIG. 8 is a graph of an example of estimation. For example, when four passes are performed based on the relationship calculated from the measurement result R1, the density of the image is estimated as in an estimation result R2.

The estimation result R2 is estimated by the relationship calculated by the measurement result R1 on the assumption that the density distribution, the amount of increase in density in one pass, and the like are constant. That is, it is estimated that the relationship between the distribution of the density formed by the first-round pass and the amount of increase in density in one pass is maintained and the same tendency also occurs in the second-round pass.

In this example, it is estimated from the measurement result R1 that the color unevenness CN occurs at the second measurement position PS2 and the like.

Example of Control for Correcting Image Data

Figure 9:
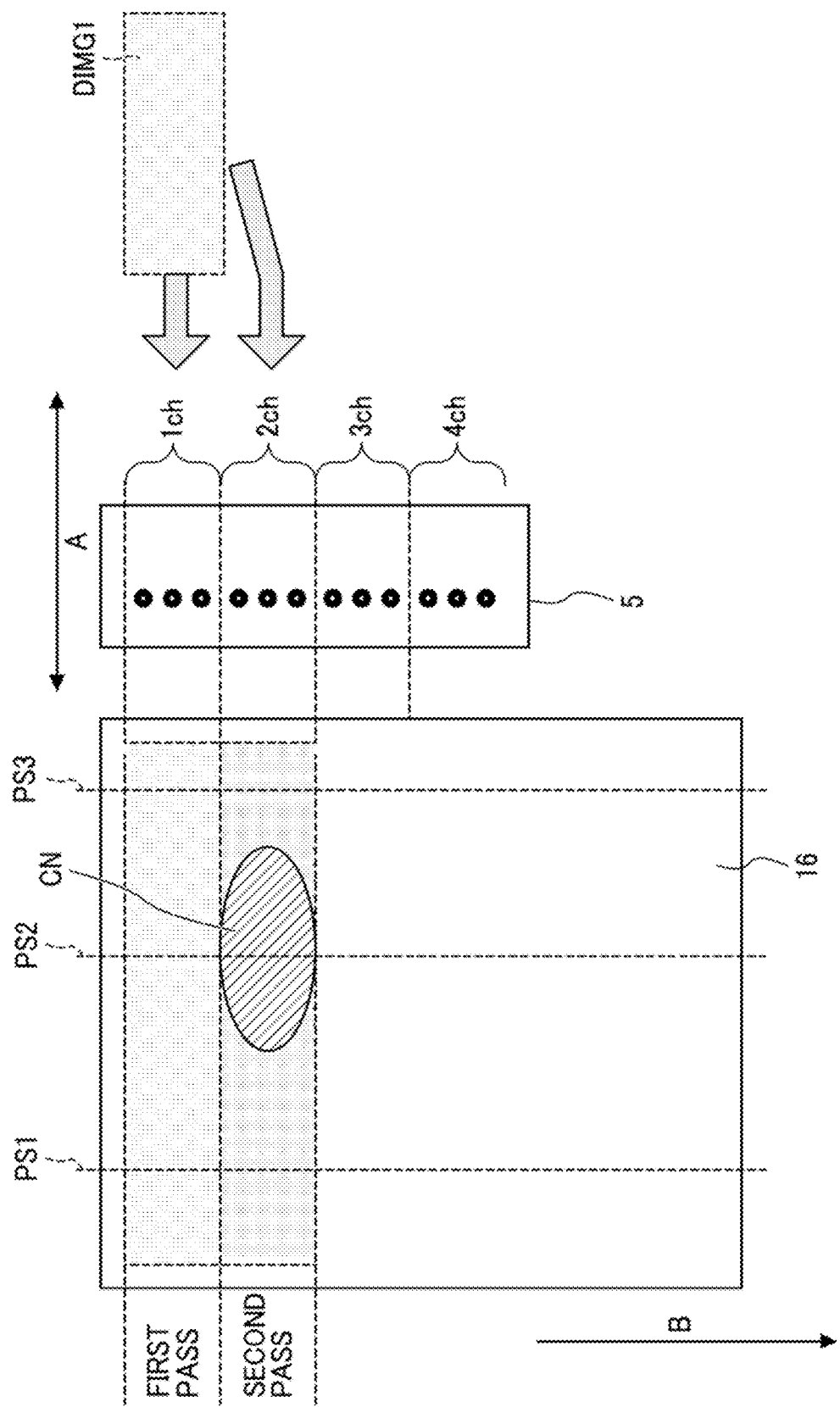
FIG. 9 is a diagram illustrating an example of control for correcting image data.

FIG. 9 is a diagram illustrating an example of control for correcting image data. Hereinafter, similarly to the above-described example, an example is described in which, among the passes performed four times, the first pass and the second pass performed in the first half are referred to as a first-round pass that is an example of the first scanning, and the third pass and the fourth pass performed in the second half are referred to as a second-round pass that is an example of the second scanning.

In this example, it is assumed that the nozzle group of "1ch" is used in the first pass. Similarly, it is assumed that the nozzle group of "2ch" is used in the second pass, the nozzle group of "3ch" is used in the third pass, and the nozzle group of "4ch" is used in the fourth pass. As described above, in the multi-pass method or the like, a plurality of nozzles included in one head are sectioned and discharge from each section is performed in each pass.

For example, if there are 320 nozzles in one head, that is, if the nozzles are 320 channels (320ch), the number of nozzles is equally sectioned per 80 nozzles. Therefore, in this case, 80 nozzles are used per one pass. The number of nozzles and the ratio of allocation may be any other number and ratio.

For example, it is assumed that an instruction is given so that all of image date (hereinafter, referred to as "pre-correction image date DIMG1") indicating regions to be formed in the first and second passes are constant in density. That is, the following example is an example in which, when an image is ideally formed according to the pre-correction image DIMG1, an image in which the same density is measured at any position is formed. However, in practice, it is assumed that the color unevenness CN occurs for some reason when the first-round pass is performed based on the pre-correction image DIMG1.

Such a state is grasped based on, for example, density measurement and estimation as illustrated in FIGS. 7 and 8. That is, the inkjet apparatus 1 can estimate a relationship such as the occurrence of the color unevenness CN at the second measurement position PS2 or the like and the degree of shading at the position at which the color unevenness CN occurs.

On the other hand, the inkjet apparatus 1 generates expected values of colors (hereinafter, simply referred to as "expected values R3") based on the pre-correction image date DIMG1, for example, as follows.

Figure 10:
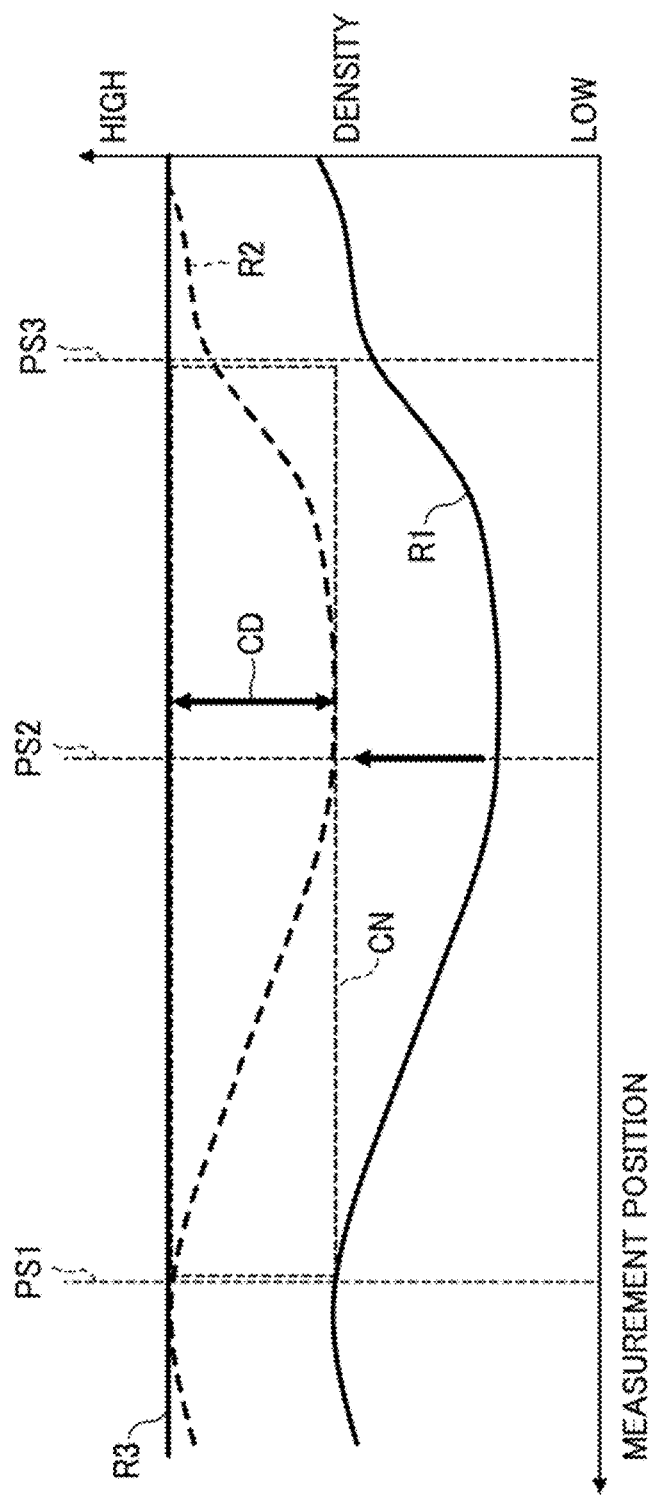
FIG. 10 is a graph representing an example of generation of expected values of colors.

FIG. 10 is a graph representing an example of generation of expected values of colors. The example of FIG. 10 is an example in which an instruction is performed so that the density of the pre-correction image DIMG1 be constant in the main scanning direction A. Therefore, an expected value R3 is calculated so that the density be the same value at any position of, e.g., the first measurement position PS1, the second measurement position PS2, and the third measurement position PS3.

As illustrated in FIG. 10, the expected value R3 is not always constant in the main scanning direction A and has a different density distribution depending on the object indicated by input image data. Below, a case in which a density distribution having a constant value in the main scanning direction A is ideal is described as an example.

That is, if there are the estimation result R2 estimated from the relationship calculated based on the measurement result R1 and the expected value R3 calculated based on image date or the like, the inkjet apparatus 1 can calculate a color difference CD, which is an example of a deviation amount, from the difference between the estimation result R2 and the expected value R3.

Based on the color difference CD, the inkjet apparatus 1 corrects the image data as follows, for example.

Figure 11:
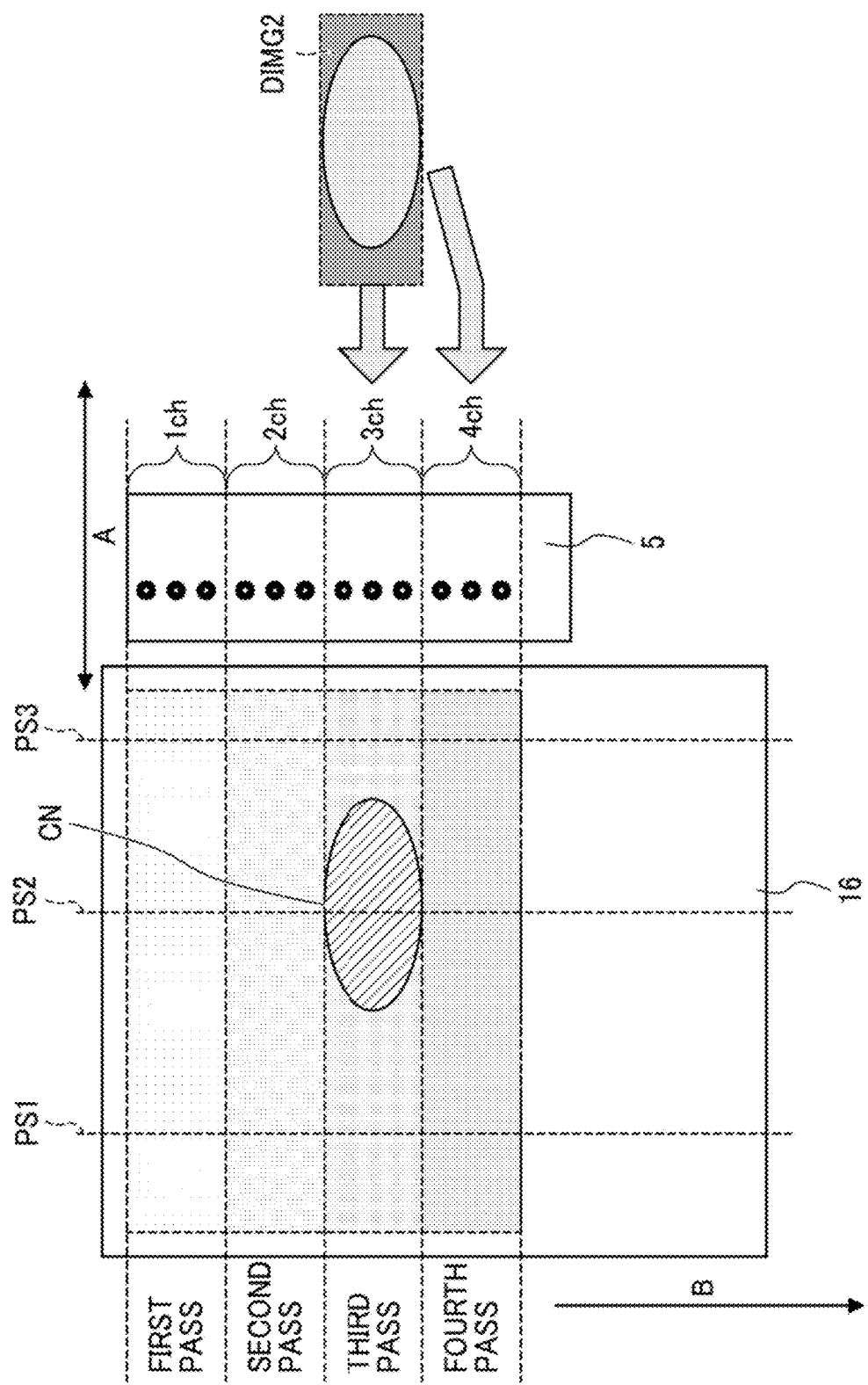
FIG. 11 is a diagram illustrating an example of corrected image data.

FIG. 11 is a diagram illustrating an example of corrected image data (or post-correction image data). For example, the pre-correction image DIMG1 is corrected to obtain corrected image data (hereinafter referred to as corrected image data DIMG2). Based on the corrected image data DIMG2, discharge is performed in "3ch" and "4ch", which are examples of the second-round pass.

Specifically, it is assumed that, before the correction is performed, "3ch (third channel)" and "4ch (fourth channel)" are controlled so as to perform discharge as indicated by the pre-correction image DIMG1, that is, so that the density is ideally constant as in the first-round pass. In such a state, the pre-correction image DIMG1 is corrected by the estimation based on the measurement result of the region formed by the first-round pass.

In this example, when the pre-correction image data DIMG1 is used, the pre-correction image data DIMG1 is corrected so as to increase the density at the position at which the color unevenness CN having a low density occurs, that is, the position corresponding to, e.g., the second measurement position PS2, and thus the corrected image data DIMG2 is generated.

For example, the correction is performed so that the color difference CD is complementarily corrected in the second-round pass. That is, when the second-round pass includes a plurality of times of passes as illustrated in FIG. 11, the correction may be divided into the number of times of passes in the second-round pass. That is, the correction amount is determined so as to reduce the deviation amount. When the image data is corrected as described above, for example, the following effect can be obtained.

Figure 12:
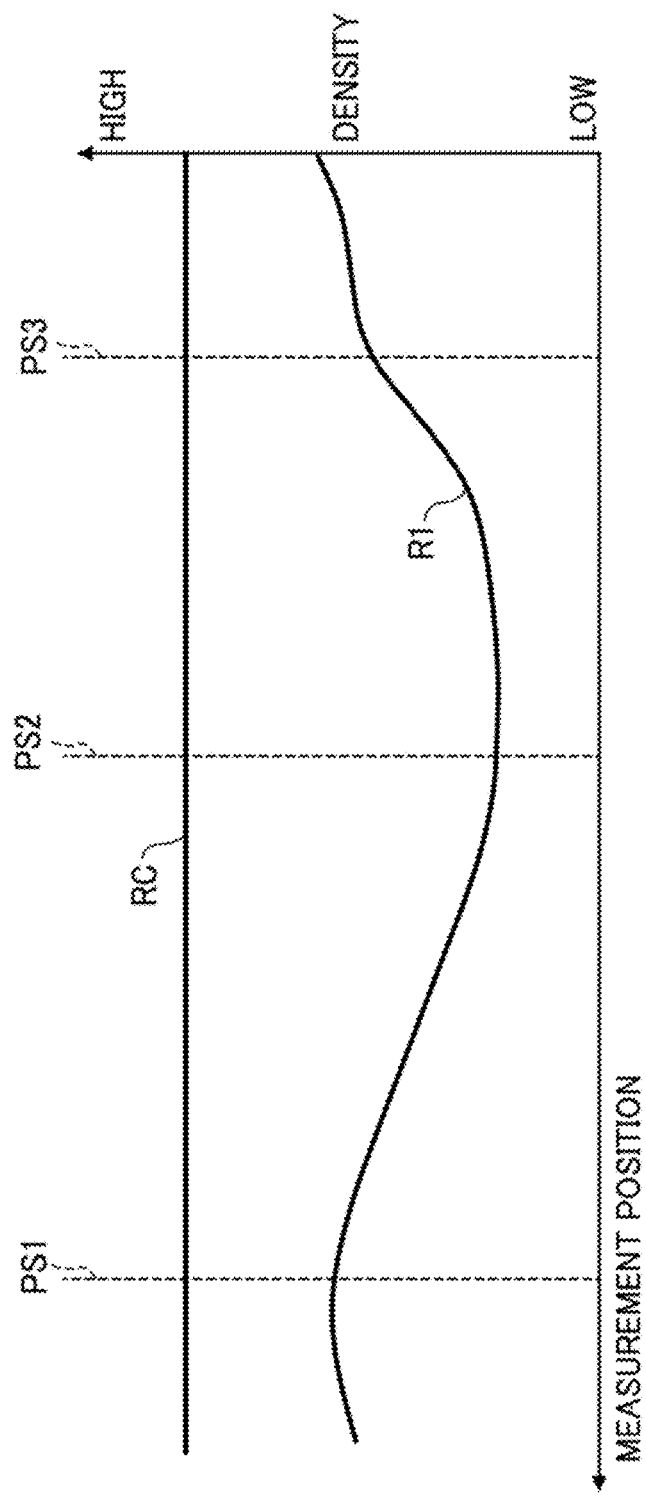
FIG. 12 is a graph of an example of effect of using the corrected image data.

FIG. 12 is a graph of an example of effect of using the corrected image data. For example, based on the corrected image data DIMG2, discharge is performed so that, e.g., the second measurement position PS2 become darker in the second-round pass. In this way, there is almost no color difference CD as in a correction result RC in FIG. 12, that is, unevenness such as color unevenness can be suppressed.

Example of Control for Correcting Drive Waveform

For example, control for correcting a drive waveform may be performed as follows. Below, an example of passes performed four times as in the correction example of image data is described. It is also assumed that the first-round pass is performed by "1ch (first channel)" and "2ch (second channel)" based on the uncorrected image DIMG1 similarly with the example of FIG. 9. Therefore, the result measured and estimated based on the result of the first-round pass is also the same as the result illustrated in FIG. 10.

The control for correcting a drive waveform is different from the control for correcting image data in that the drive waveform is corrected as follows.

Figure 13:
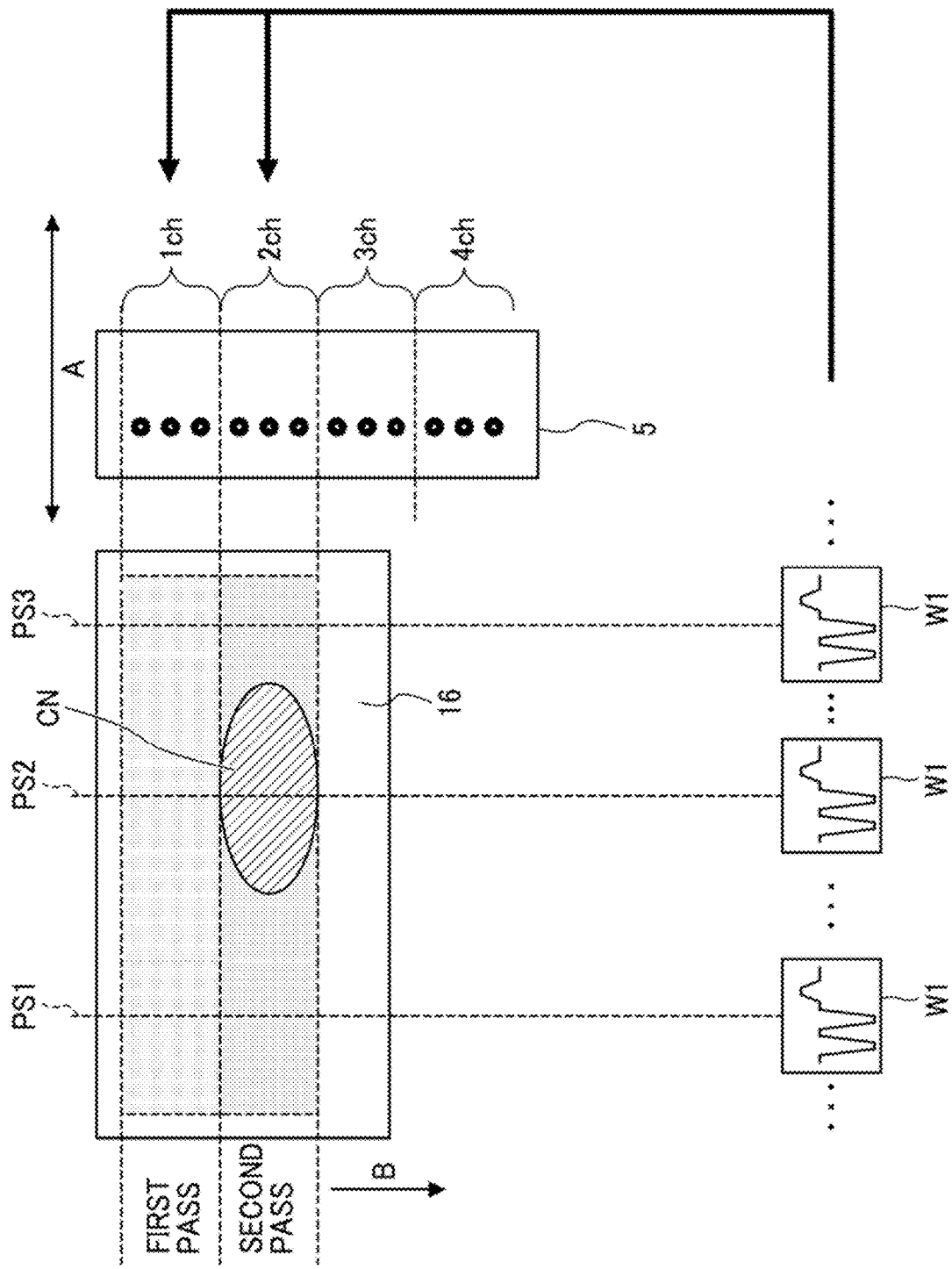
FIG. 13 is a diagram illustrating an example of control for correcting a drive waveform.

FIG. 13 is a diagram illustrating an example of control for correcting a drive waveform. For example, in a case in which image data is instructed so as to achieve uniform density, an image is formed based on a drive waveform (hereinafter, a pre-correction drive waveform is referred to as a "pre-correction drive waveform W1") in a state before correction. Therefore, it is assumed that an image is formed with the pre-correction drive waveform W1 at any of the first measurement position PS1, the second measurement position PS2, and the third measurement position PS3.

In this example, the pre-correction drive waveform W1 used at the position at which the color unevenness CN occurs, that is, the second measurement position PS2 is corrected as follows.

Figure 14:
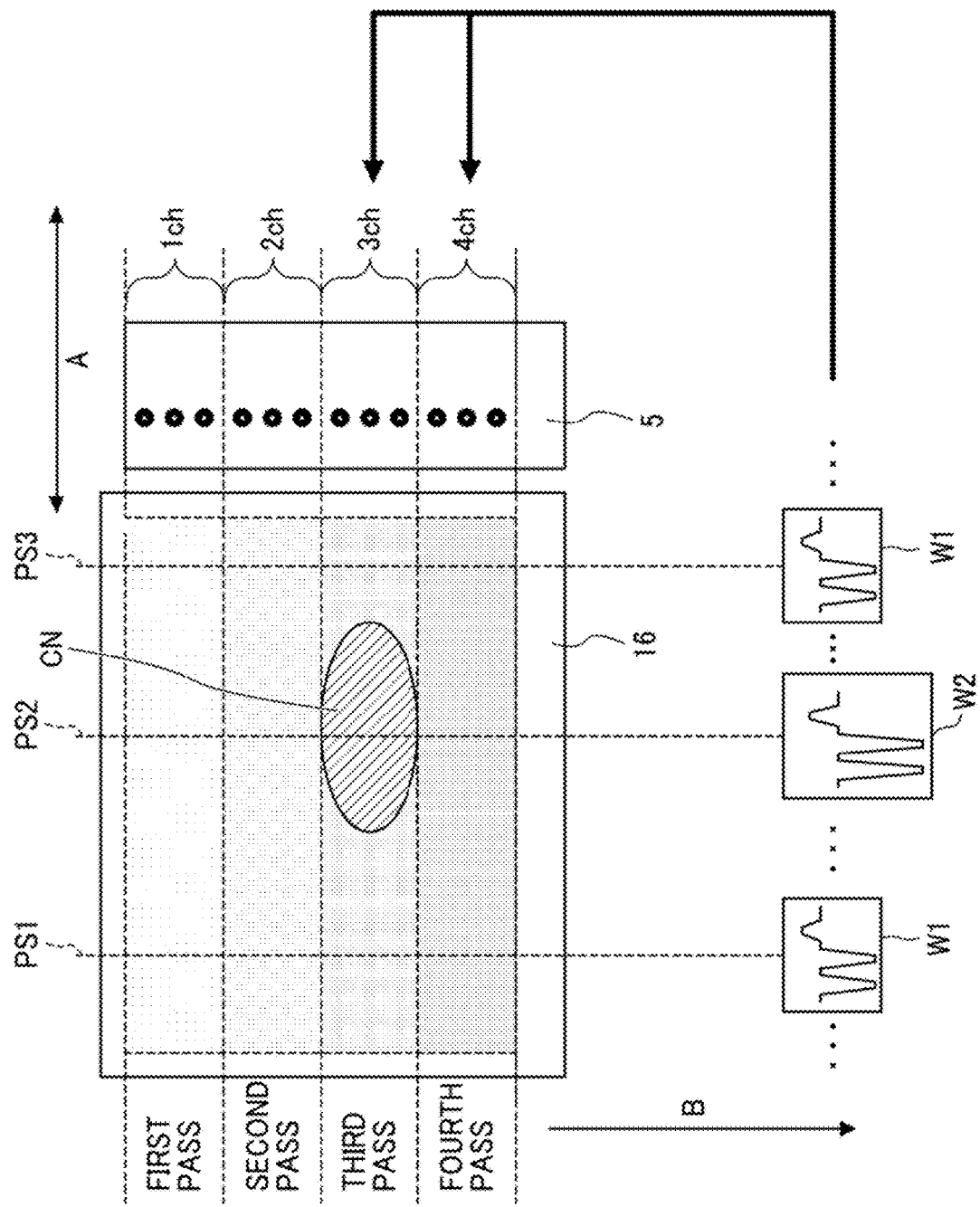
FIG. 14 is a diagram illustrating an example of a case in which a drive waveform is corrected.

FIG. 14 is a diagram illustrating an example of a case in which a drive waveform is corrected. For example, in the second-round pass, control is performed so that the drive waveform used at the second measurement position PS2 be a corrected drive waveform (hereinafter referred to as "corrected drive waveform W2").

For example, the pre-correction drive waveform W1 is corrected based on the deviation amount, for example, based on a table such as the following (Table 1) set in advance.

TABLE 1

| Color Difference | Voltage Correction Magnification |
|---|---|
| −1 | ×2.0 |
| −0.5 | ×1.5 |

TABLE 1-continued

| Color Difference | Voltage Correction Magnification |
|---|---|
| ... | ... |
| 0 | ×1.0 |
| ... | ... |
| 0.5 | ×0.75 |
| 1 | ×0.5 |

The "color difference" in the above-described Table 1 is, for example, a deviation amount of the color difference CD or the like calculated as illustrated in FIG. 10. As seen in Table 1, for example, a "voltage correction magnification", which is an example of a parameter for correcting the drive waveform, is set in advance for the "color difference".

Accordingly, when the table illustrated in Table 1 is set in advance, the correction amount for the deviation amount is determined.

The correction of the drive waveform is not limited to the correction of the voltage. For example, the current, so-called rise time (Tr), or fall time (Tf) of the drive waveform may be a correction target.

For example, as described above, the drive waveform is corrected so that the density be higher in the second-round pass at the position at which the unevenness in which the density becomes low is expected to occur. In this way, the second-round pass can be controlled so that the unevenness estimated based on the first-round pass is reduced. That is, when the drive waveform used in the second-round pass is corrected so as to cancel the estimated unevenness, the unevenness can be reduced.

When the drive waveform is corrected, the correction can be performed with simple processing. Accordingly, such correction can be easily implemented with, e.g., even an arithmetic device having a low arithmetic capability.

Example of Control for Correcting Liquid Size

For example, control for correcting the size of liquid may be performed as follows. Below, an example of passes performed four times as in the correction example of image data is described. It is also assumed that the first-round pass is performed by "1ch" and "2ch" based on the uncorrected image DIMG1 similarly with the example of FIG. 9. Therefore, the result measured and estimated based on the result of the first-round pass is also the same as the result illustrated in FIG. 10.

The control for correcting the size of liquid is different from the control for correcting image data in that the size of the liquid is corrected as follows.

Figure 15:
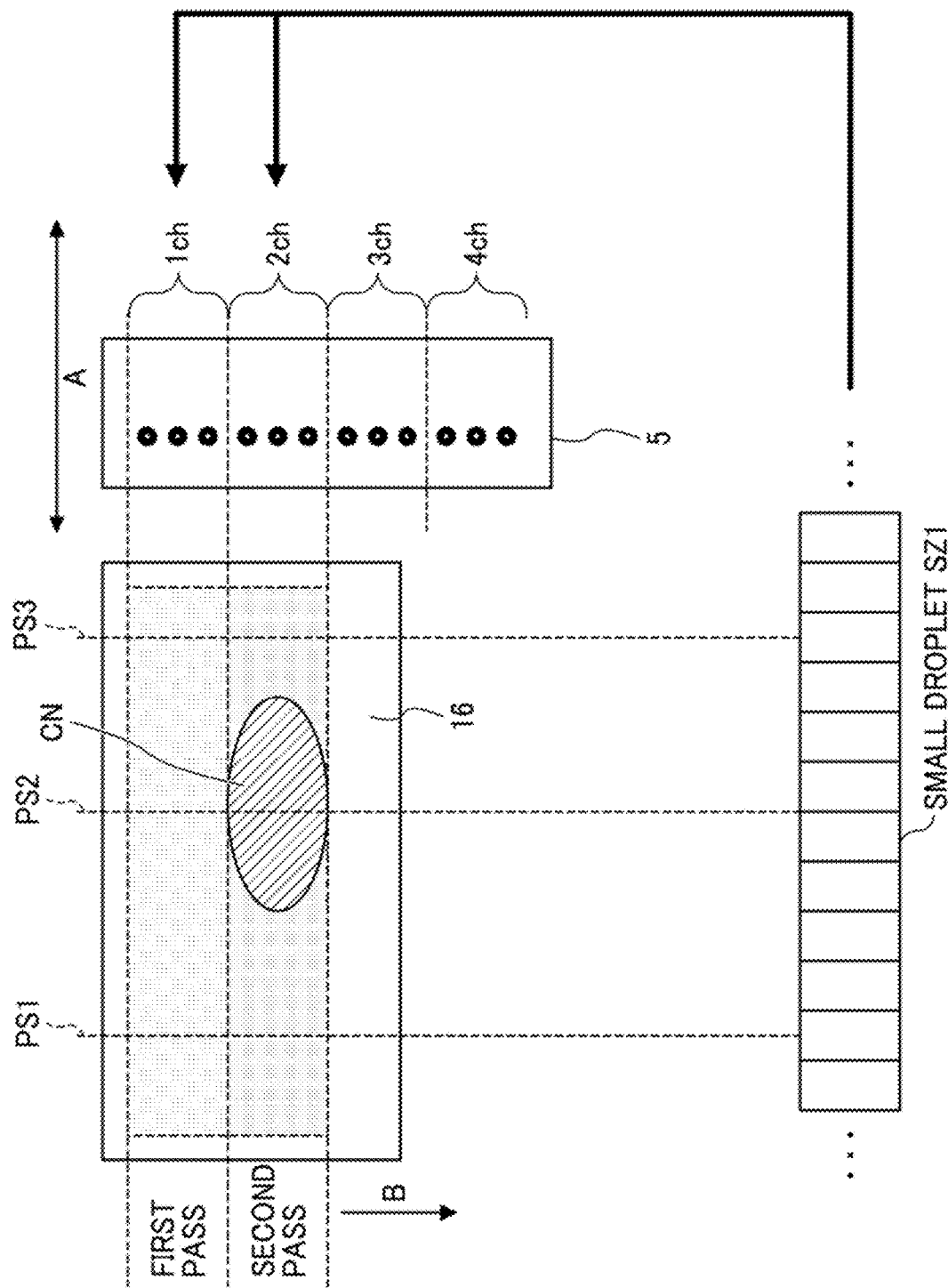
FIG. 15 is a diagram illustrating an example of control for correcting the size of liquid.

FIG. 15 is a diagram illustrating an example of control for correcting the size of liquid. For example, in the case of image data for instructing an image to be formed to have a uniform density, the size of liquid (hereinafter, simply referred to as "size") to be discharged by a head unit is set to be consistently a small droplet SZ1 in a state before the correction is performed.

Therefore, it is assumed that an image is formed with the size of the small droplet SZ1 at any of the first measurement position PS1, the second measurement position PS2, and the third measurement position PS3.

In this example, the pre-correction drive waveform W1 used at the position at which the color unevenness CN occurs, that is, the second measurement position PS2 is corrected as follows.

Figure 16:
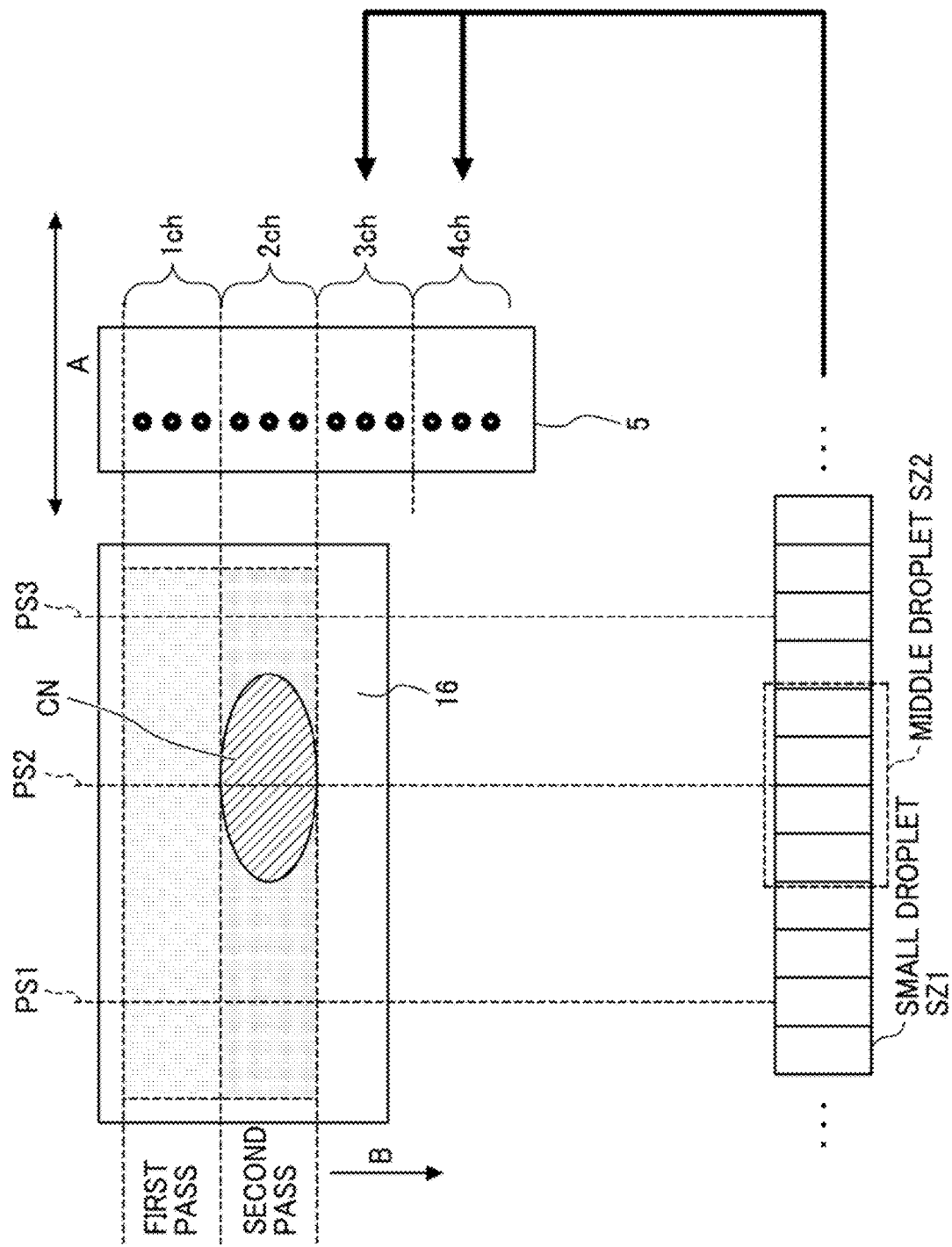
FIG. 16 is a diagram of an example of a case in which the size of liquid is corrected.

FIG. 16 is a diagram of an example of a case in which the size of liquid is corrected. For example, in the second-round pass, control is performed so that the size used at the second measurement position PS2 is corrected to a medium droplet SZ2.

The size may be corrected based on the deviation amount. That is, when the deviation amount is a large value equal to or larger than a certain value, the size may be corrected from the small droplet SZ1 to, e.g., a large droplet.

On the other hand, when the density is higher at some positions than at other positions, correction is performed to reduce the size.

For example, as described above, the size is corrected so that the density be higher in the second-round pass at the position at which the unevenness in which the density becomes low is expected to occur. In this way, the second-round pass can be controlled so that the unevenness estimated based on the first-round pass is reduced. That is, when the size used in the second-round pass is corrected so as to cancel the estimated unevenness, the unevenness can be reduced.

In addition, when the size is corrected, the correction can be performed with simple processing. Accordingly, such correction can be easily implemented with, e.g., even an arithmetic device having a low arithmetic capability.

Example of Correcting Solid Portion

The correction is desirably performed exclusively or intensively onto a so-called solid position in an image to be formed. Since unevenness occurs at the position of a solid portion, the solid portion is easily recognized with naked eyes. That is, if there is unevenness at the position of the solid portion, the image quality of the formed image deteriorates.

The solid portion is a portion in which a color has a predetermined area or more in an image. Therefore, for example, in input data or image data, a portion in which the positions to which liquid is discharged are continuous in a certain area or more is determined to be a solid portion. A threshold value for determining the area to be solid is set in advance, for example. Further, an input for designating a solid portion may be performed.

In this way, when a portion determined to be solid is particularly subjected to correction, an image with less unevenness can be formed.

Comparative Example

Figure 17:
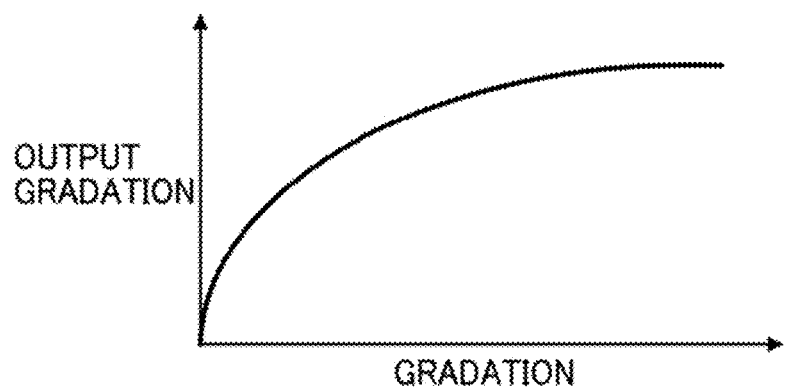
FIG. 17 is a diagram illustrating an example of output in a pass in a comparative example.

FIG. 17 is a diagram illustrating an example of output in a pass in a comparative example. In FIG. 17, the horizontal axis represents gradation and the vertical axis represents output gradation. Specifically, the intensity of discharge by the head unit (corresponding to "output gradation" in FIG. 17) is set in advance in association with the density (corresponding to "gradation" in FIG. 17) of an image indicated by image data, for example, as illustrated in FIG. 17.

When the output gradation with respect to the gradation is constant as illustrated in FIG. 17 in the passes performed a plurality of times, for example, the following results are obtained.

Figure 18:
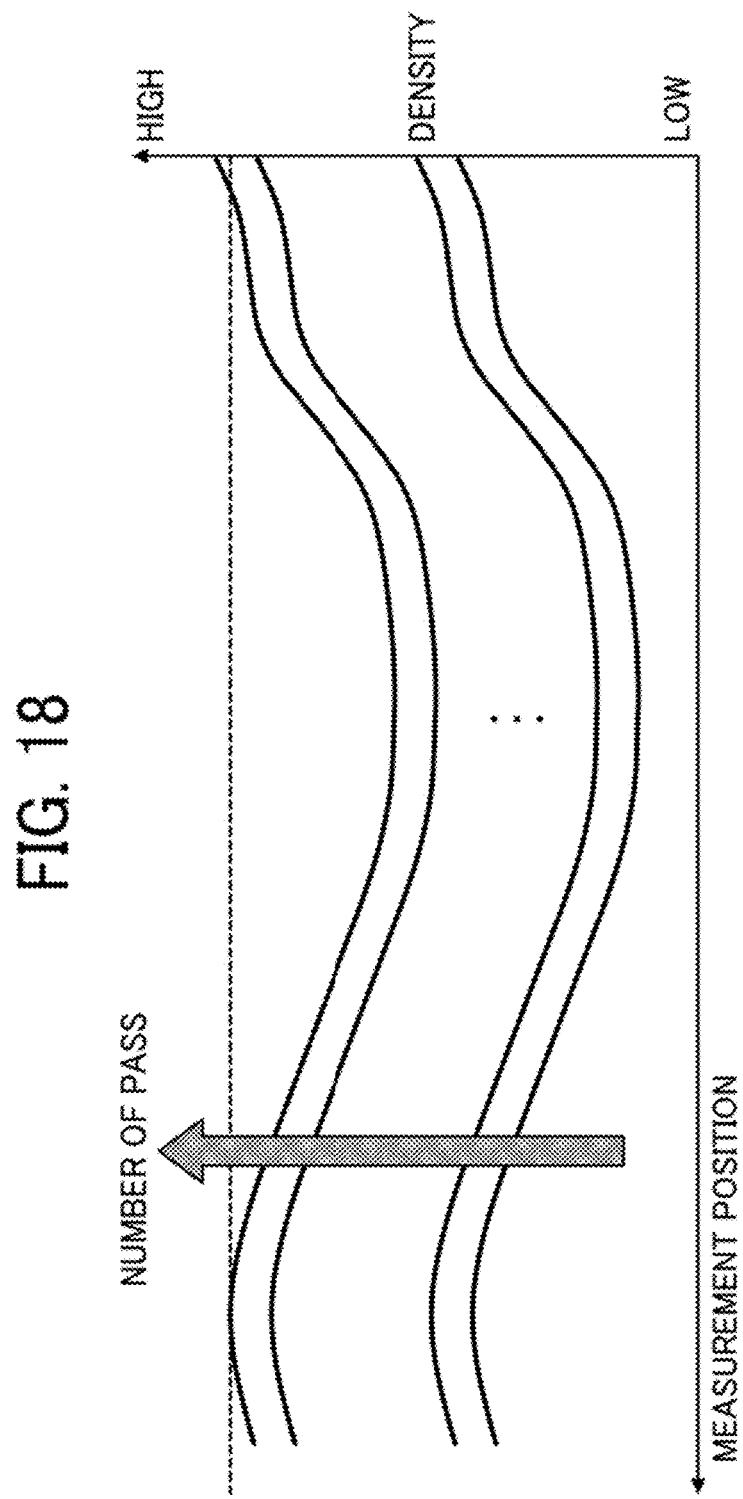
FIG. 18 is a diagram illustrating an example of an output result of a comparative example.

FIG. 18 is a diagram illustrating an example of an output result of a comparative example. As illustrated in FIG. 18, when the output gradation with respect to the gradation is constant, an uneven image as described below is formed in which the density is not constant depending on the position.

Figure 19:
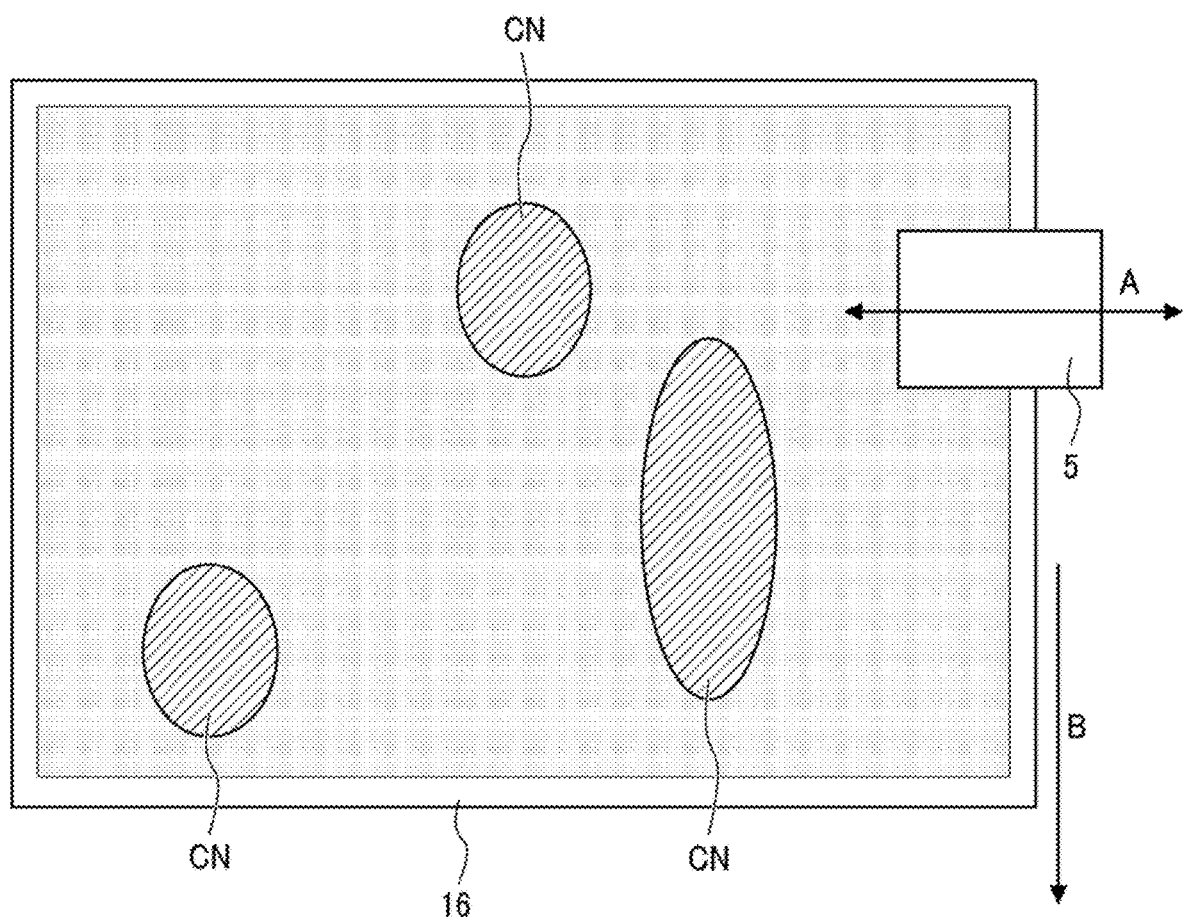
FIG. 19 is a diagram illustrating an example of formation of an uneven image.

FIG. 19 is a diagram illustrating an example of formation of an uneven image. If vibration of the carriage, variations in the surface of the recording medium and the amount of conveyance of the recording medium, or a combination thereof occurs, for example, color unevenness CN as illustrated in FIG. 19 may occur.

On the other hand, the functional configuration as described below can reduce unevenness.

Functional Configuration

Figure 20:
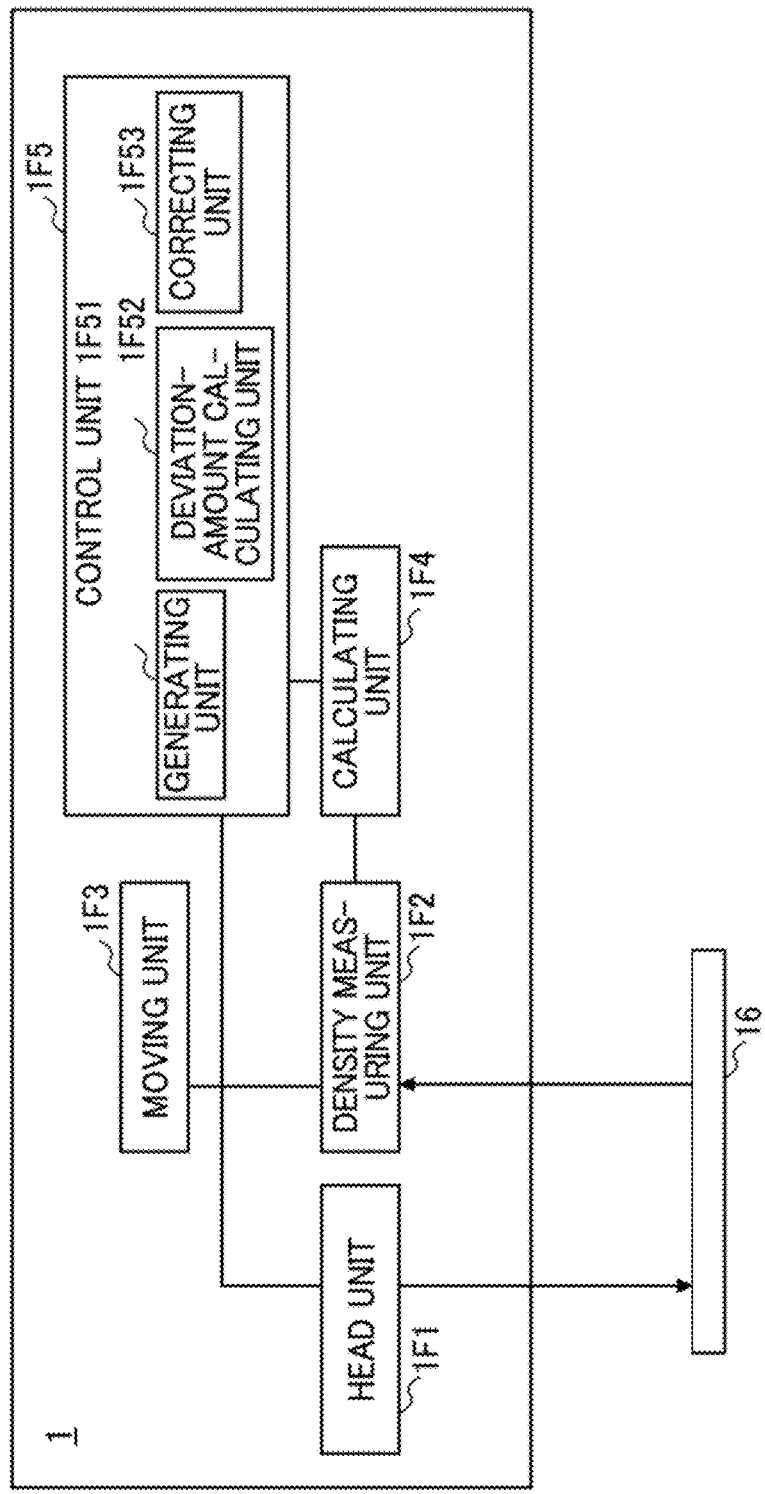
FIG. 20 is a diagram illustrating an example of a functional configuration.

FIG. 20 is a diagram illustrating an example of the functional configuration. For example, the inkjet apparatus 1 of FIG. 20 has a functional configuration including a head unit 1F1, a density measuring unit 1F2, a moving unit 1F3, a calculating unit 1F4, and a control unit 1F5.

The head unit 1F1 discharges liquid. For example, the head unit 1F1 is implemented with, e.g., a head configuration illustrated in FIG. 4.

The density measuring unit 1F2 performs, e.g., a density measurement procedure of measuring the density of a region formed by discharge in the first scanning. For example, the density measuring unit 1F2 is implemented with the colorimetric sensor 42 or the like.

The moving unit 1F3 performs, e.g., a movement procedure of moving the measurement position at which the density measuring unit 1F2 performs measurement. For example, the moving unit 1F3 is implemented with a moving device such as the main scanning motor 8.

The calculating unit 1F4 performs, e.g., a calculation procedure of calculating the relationship between the measurement position and the density. For example, the calculating unit 1F4 is implemented with the drive control board 18 or the like.

The control unit 1F5 has a functional configuration including, for example, a generating unit 1F51, a deviation-amount calculating unit 1F52, and a correcting unit 1F53. For example, the control unit 1F5 is implemented with the drive control board 18 or the like.

The generating unit 1F51 performs, e.g., a generation procedure of generating expected values of colors constituting an image.

The deviation-amount calculating unit 1F52 performs, e.g., a deviation amount calculation procedure of calculating a deviation amount between the density of the region estimated by the relationship calculated by the calculating unit 1F4 and the expected value generated by the generating unit 1F51.

The correcting unit 1F53 performs, e.g., a correction procedure of correcting the deviation amount before the formation of the image is completed by the discharge of the head unit 1F1 in the second-round pass.

Overall Process

Figure 21:
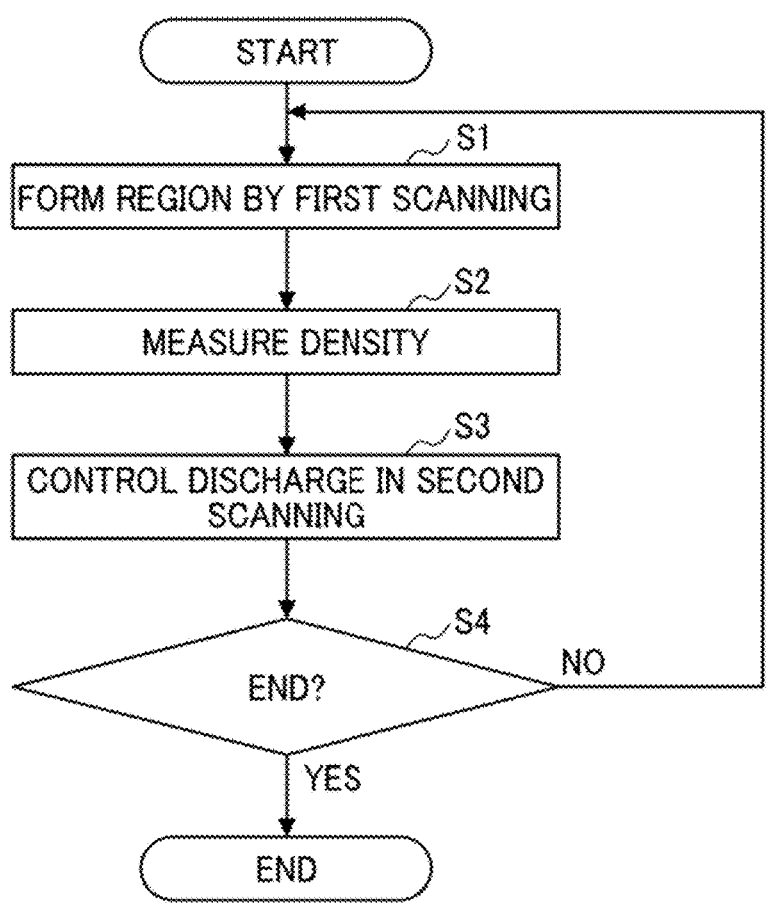
FIG. 21 is a diagram illustrating an example of overall process.

FIG. 21 is a diagram illustrating an example of overall process.

In step S1, the head unit 1F1 forms a region with the liquid discharged in the first scanning.

In step S2, the density measuring unit 1F2 and the moving unit 1F3 measure the density of the region formed in step S1. Then, based on the measurement result, the calculating unit 1F4 calculates the relationship between the measurement position and the density.

In step S3, the control unit 1F5 performs correction and the like.

In step S4, the control unit 1F5 determines whether the process is to be ended.

Next, when it is determined that the process is to be ended (YES in step S4), the control unit 1F5 ends the overall process. Alternatively, when it is determined that the process is not to be ended (NO in step S4), the control unit 1F5 proceeds to step S1.

When the above-described overall process is performed, for example, the following processing results are obtained.

Figure 22:
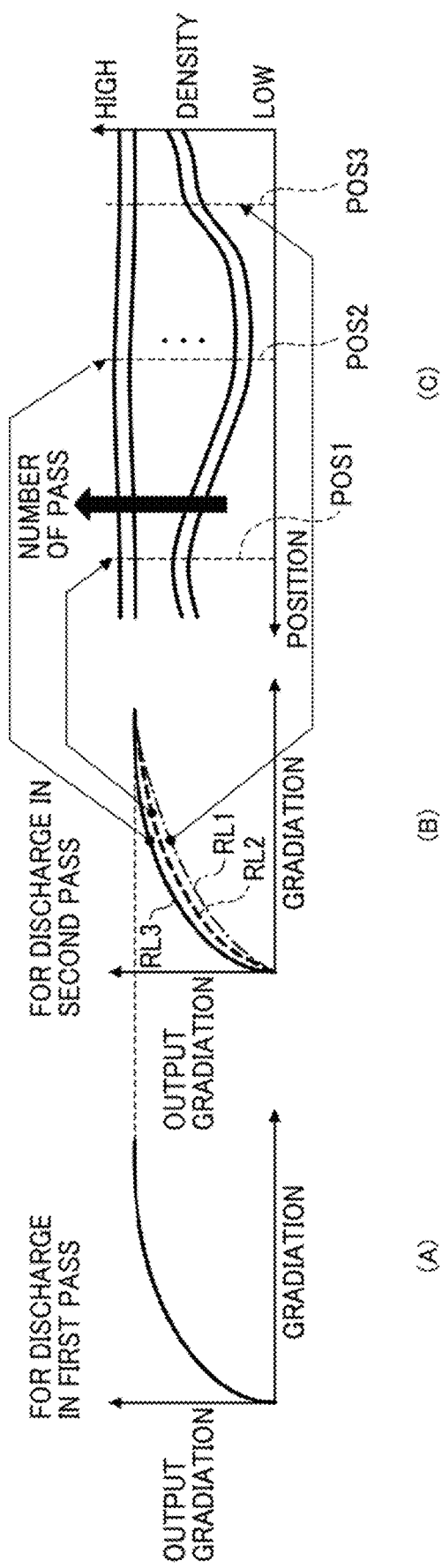
FIG. 22 is a diagram illustrating an example of processing results of the overall process.

FIG. 22 is a diagram illustrating an example of processing results of the overall process.

As illustrated in part (A) of FIG. 22, the output gradation such as the amount of liquid discharged in a pass is set in advance, for example. The first-round pass is performed based on such a setting. When control is performed with the setting of part (A) of FIG. 22 being unchanged, unevenness may occur as described in the comparative example. Therefore, the control unit 1F5 performs control to perform, e.g., correction on the position at which unevenness is expected to occur, using the relationship up to the first-round pass.

Part (B) of FIG. 22 illustrates an example of the result of control such as correction. For example, in a case in which unevenness occurs, as illustrated in part (C) of FIG. 22, a position at which unevenness is likely to occur can be estimated from the relationship up to the first-round pass.

Therefore, for example, a first position POS1 is corrected to obtain a second control result RL2. Similarly, a second position POS2 is corrected to obtain a third control result RL3. Further, a third position POS3 is corrected to obtain a first control result RL1. In such a manner, the correspondence between the gradation and the output gradation is adjusted by the control for correcting the image data, the size, the drive waveform, or a combination thereof. Thus, an object with less unevenness can be formed as illustrated in part (C) of FIG. 22.

In addition, with the above-described configuration, unevenness can be reduced before all passes are completed. That is, the unevenness can be reduced while the image is formed. Thus, the unevenness can be restrained in a so-called real-time manner.

Unevenness such as color unevenness is caused by, for example, vibration of the carriage, variations in the surface of the recording medium or the amount of conveyance of the recording medium, or a combination thereof. Therefore, in some cases, it may be difficult to assume, e.g., a position at which unevenness occurs in advance. That is, unevenness may occur randomly. Therefore, a configuration capable of restraining unevenness in real time as in the present embodiment is desirable.

Other Embodiments

Unevenness may have a high density, for example. Therefore, when the density is adjusted, correction may be controlled to lower the density in the second-round pass.

The liquid is not limited to ink. That is, the liquid may be of any type as long as the liquid can be colored on a recording medium.

The number of each device or apparatus described above is not limited to one. That is, each device or apparatus may be constituted of a plurality of devices. That is, for example, the liquid discharge system may include a liquid discharge apparatus and an information processing apparatus.

The process of achieving the liquid discharge method performed by the liquid discharge apparatus may be implemented with, e.g., a program described in a programming language.

The program can be stored and distributed in a storage medium such as a flash memory, a flexible disk, or an optical disk. The program may be distributed through an electric communication line.

Embodiments of the present disclosure are not limited to the elements described in the above-described embodiments. The elements of the above-described embodiments can be modified without departing from the gist of the present disclosure, and can be appropriately determined according to the application form. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A liquid discharge apparatus, comprising:
a head configured to discharge liquid in a plurality of times of scanning;
a sensor configured to measure a density of a region formed with the liquid discharged in first scanning among the plurality of times of scanning;
a motor configured to move a measurement position at which the sensor performs measurement; and
control circuitry configured to control discharge of the head in second scanning performed after the first scanning among the plurality of times of scanning, based on the measurement position and the density measured at the measurement position,
wherein the head is configured to discharge the liquid to form an image with the liquid, and
the control circuitry is configured to:
generate an expected value of a color of the image;
calculate a deviation amount between the density and the expected value, based on the density and the measurement position; and
correct the deviation amount before formation of the image is completed by discharge of the head in the second scanning.

2. The liquid discharge apparatus according to claim 1, wherein the control circuitry is configured to correct a drive waveform input to the head.

3. The liquid discharge apparatus according to claim 1, wherein the head is configured to discharge the liquid based on input image data to form the image, and
the control circuitry is configured to correct the image data.

4. The liquid discharge apparatus according to claim 1, wherein the control circuitry is configured to correct a size of the liquid to be discharged from the head.

5. The liquid discharge apparatus according to claim 1, wherein the control circuitry is configured to correct a solid portion having an area equal to or larger than a predetermined value in the image.

6. The liquid discharge apparatus according to claim 1, wherein the control circuitry is configured to calculate a relationship between the density and, the measurement position.

7. A liquid discharge method for a liquid discharge apparatus including a head configured to discharge liquid in a plurality of times of scanning, the head being configured to discharge the liquid to form an image with the liquid, the method comprising:
measuring, with the liquid discharge apparatus, a density of a region formed with the liquid discharged in first scanning among the plurality of times of scanning;
moving, with the liquid discharge apparatus, a measurement position at which the liquid discharge apparatus performs the measuring of the density;
controlling, with the liquid discharge apparatus, discharge of the head in second scanning performed after the first scanning among the plurality of times of scanning, based on the measurement position and the density measured at the measurement position;

generating an expected value of a color of the image;

calculating a deviation amount between the density and the expected value, based on the density and the measurement position; and correcting the deviation amount before formation of the image is completed by discharge of the head in the second scanning.

8. A non-transitory storage medium storing program code for causing a computer to execute a liquid discharge process for a liquid discharge apparatus including a head configured to discharge liquid in a plurality of times of scanning, the head being configured to discharge the liquid to form an image with the liquid, the process comprising:

measuring, with the liquid discharge apparatus, a density of a region formed with the liquid discharged in first scanning among the plurality of times of scanning;

moving, with the liquid discharge apparatus, a measurement position at which the liquid discharge apparatus performs the measuring of the density;

controlling, with the liquid discharge apparatus, discharge of the head in second scanning performed after the first scanning among the plurality of times of scanning, based on the measurement position and the density measured at the measurement position;

generating an expected value of a color of the image;

calculating a deviation amount between the density and the expected value, based on the density and the measurement position; and correcting the deviation amount before formation of the image is completed by discharge of the head in the second scanning.

* * * * *